US009491573B2

(12) United States Patent
Khare (10) Patent No.: US 9,491,573 B2
(45) Date of Patent: Nov. 8, 2016

(54) COMMUNICATION DEVICE FOR PROVIDING VALUE-ADDED INFORMATION BASED UPON CONTENT AND/OR CONTEXT INFORMATION

(75) Inventor: Aniruddha Khare, Potomac, MD (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 1216 days.

(21) Appl. No.: 12/265,821

(22) Filed: Nov. 6, 2008

(65) Prior Publication Data

US 2010/0111071 A1    May 6, 2010

(51) Int. Cl.
*H04W 4/00* (2009.01)
*H04W 4/02* (2009.01)
*H04L 29/08* (2006.01)

(52) U.S. Cl.
CPC .............. *H04W 4/02* (2013.01); *H04L 67/18* (2013.01); *H04L 67/20* (2013.01)

(58) Field of Classification Search
USPC ........ 370/352; 455/563, 414.1, 414.2, 414.3, 455/414.4, 414.5; 379/88.11, 88.14, 88.01; 709/202; 704/211
See application file for complete search history.

(56) References Cited

U.S. PATENT DOCUMENTS

| 2003/0154009 A1* | 8/2003 | Basir et al. ................. 701/35 |
| 2007/0133875 A1* | 6/2007 | Lindroos et al. ............ 382/181 |
| 2008/0167813 A1* | 7/2008 | Geelen et al. ............... 701/213 |
| 2009/0234655 A1* | 9/2009 | Kwon ........................ 704/270.1 |
| 2010/0086107 A1* | 4/2010 | Tzruya ....................... 379/88.01 |
| 2014/0011520 A1* | 1/2014 | Chan et al. ................. 455/456.1 |

FOREIGN PATENT DOCUMENTS

WO    WO 2004/057892 A1    7/2004

OTHER PUBLICATIONS

Hicks, Jamey. "A Mobile Phone Ecosystem: MIT and Nokia's Joint Research Venture." IEEE (Sep./Oct. 2006), pp. 78 and 79.

* cited by examiner

*Primary Examiner* — Zewdu A Beyen
(74) *Attorney, Agent, or Firm* — Michael A. Davis, Jr.; Frank D. Cimino (57) ABSTRACT

A communication device, for use in a communication network, provides value-added information to a user of the communication device. The communication device includes a transceiver, operable to transmit and receive communications over the communication network, and a processor. The processor is operable to facilitate detecting context information representative of an environment in which the communication device is operated, detecting content information of a multi-directional communication stream by identifying significant words in the communication stream, encoding the detected context and content information as meta-information, transmitting the meta-information as a request for value-added information, receiving value-added information in response, and providing the value-added information to the user of the communication device. A method for providing value-added information to a user of a communication device and a communication system for providing value-added information are also disclosed.

15 Claims, 4 Drawing Sheets

COMMUNICATION DEVICE FOR PROVIDING VALUE-ADDED INFORMATION BASED UPON CONTENT AND/OR CONTEXT INFORMATION

TECHNICAL FIELD

The technical field relates in general to speech encoding, and more specifically to speech encoding for the purpose of obtaining value-added information related to the encoded speech.

BACKGROUND

The primary objective of prior art speech encoding has been directed toward improving efficiency and robustness in the transmission of digitized speech signals and enabling verbatim (i.e., artifact free) reproduction of these same signals. Wideband speech coding techniques providing 8 KHz dynamic range (using 16 KHz sampling) or higher have enabled a higher fidelity in digitized speech communication. The entire process has been focused around network optimization and reproduction of speech at the receiving end to the benefit of human listeners. However as IP networks have increased in size (for example, as to easily carry high bandwidth video), optimizing bandwidth of associated speech signals has become of relatively lower value and of lower priority.

SUMMARY

Embodiments described herein improve upon prior art speech encoding by performing real time analysis of the content of encoded speech communications as well as the context in which the speech communications take place in order to provide value-added information to users of communication devices. Communication devices described herein can include a processor/encoder ("semantic codec") that transmits meta-information related to the content and context information described above in order to acquire the value-added information.

Accordingly, a first embodiment described herein provides a method for providing value-added information to a user of a communication device. In the method, context information representative of an environment in which the communication device is operated is detected. Further, content information of a multi-directional communication stream transmitted and received in a communication network by the communication device is detected by identifying significant words in the multi-directional communication stream. Additionally, the detected context information and the detected content information are encoded as meta-information. Also, the value-added information is acquired by performing real-time processing using the meta-information. Finally, the value-added information is provided to the user of the communication device.

A second embodiment described herein provides a communication device that is for use in a communication network and that provides value-added information to a user of the communication device. The communication device comprises a transceiver that is operable to transmit and receive communications over the communication network and a processor that is cooperatively operable with the transceiver. The processor is configured to facilitate detecting context information representative of an environment in which the communication device is operated. The processor is also configured to facilitate detecting content information of a multi-directional communication stream transmitted and received by the communication device by identifying significant words in the multi-directional communication stream. The processor is also configured to facilitate encoding the detected context information and the detected content information as meta-information. The processor is also configured to facilitate transmitting the meta-information as a request for the value-added information, and to additionally receive the value-added information in response. Finally, the processor is also configured to facilitate providing the value-added information to the user of the communication device.

A third embodiment described herein provides a communication system for providing value-added information. The communication system comprises at least two communication devices that are operable to communicate with each other. Each communication device is configured to detect content information in a multi-directional communication stream between these at least two communication devices. Each communication device is further configured to detect its own context information representative of an environment in which it operates and to receive context information representative of an environment in which at least one other of the at least two communication devices currently operates. Each communication device is also configured to encode its own detected context information and detected content information as multi-dimensional meta-information. Each communication device is additionally configured to acquire the value-added information by transmitting the meta-information it encodes and to receive the value-added information in response. Finally, each communication device is configured to provide the value-added information to its user.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

As further discussed herein below, various inventive principles and combinations thereof are advantageously employed to enable a user of a communication device to obtain value-added information that is pertinent to the content and context of a communication stream engaged in by the user.

The instant disclosure is provided to further explain in an enabling fashion the best modes of performing one or more embodiments. The disclosure is further offered to enhance an understanding and appreciation for the novel principles and advantages associated with said embodiments. The disclosure is not intended to be limiting in any manner, and the invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

As mentioned above, embodiments described herein perform real time analysis of the content of speech communications, as well as real time analysis of the context in which the speech communications take place, in order to provide value-added information to users of communication devices. The potential benefits arising from using technology to determine the content of speech communications, and receiving value-added information related thereto, are numerous. For example, a conversation related to particular goods needing to be purchased could result in value-added information being provided to a user of a communication device that lists which merchants offer the goods for sale, and where the merchants are located. A conversation related to an appointment needing to be made could result in value-added information being provided that would include scheduling the appointment in a calendar application associated with the communication device as well as presenting a list of service providers related to the type of potential appointment.

The potential benefits arising from using technology to determine the context of speech communications, and receiving value-added information related thereto, are also numerous. For example, if it is determined that the context of a conversation, in which specified goods to be purchased are discussed, is that of a vehicle stuck in traffic slowdown, the value-added information provided could be not just potential merchants offering the goods for sale, but the closest merchant in terms of time to arrival, or even alternative products, given the potential difficulty in acquiring the specified goods. With respect to a conversation related to scheduling of an appointment, if it is determined that the context of such a conversation is that the time and date of the conversation are on a weekend evening, the value-added information provided might include a list of service providers that are available for weekend appointments, or alternatively, the entry of an appointment in a calendar application associated with the communication device which would be the earliest appointment available during the work week.

The above discussed examples are not intended to be limiting but are provided merely for purposes of illustration of the potential of examples described herein. Simply put, the understanding of the content of conversation is becoming more and more important as machines, in addition to human listeners, are capable of listening to, and understanding, speech communication. The cognition of the context in which speech communications occur is equally important due to advancements in communication technologies and tools which allow users to engage in conversations in varied background contexts (e.g., noisy environments) with multiple parties, while simultaneously performing background tasks (e.g., speaking on phone while driving), using interfaces implemented to accept voice commands that control all communication services.

Figure 1:
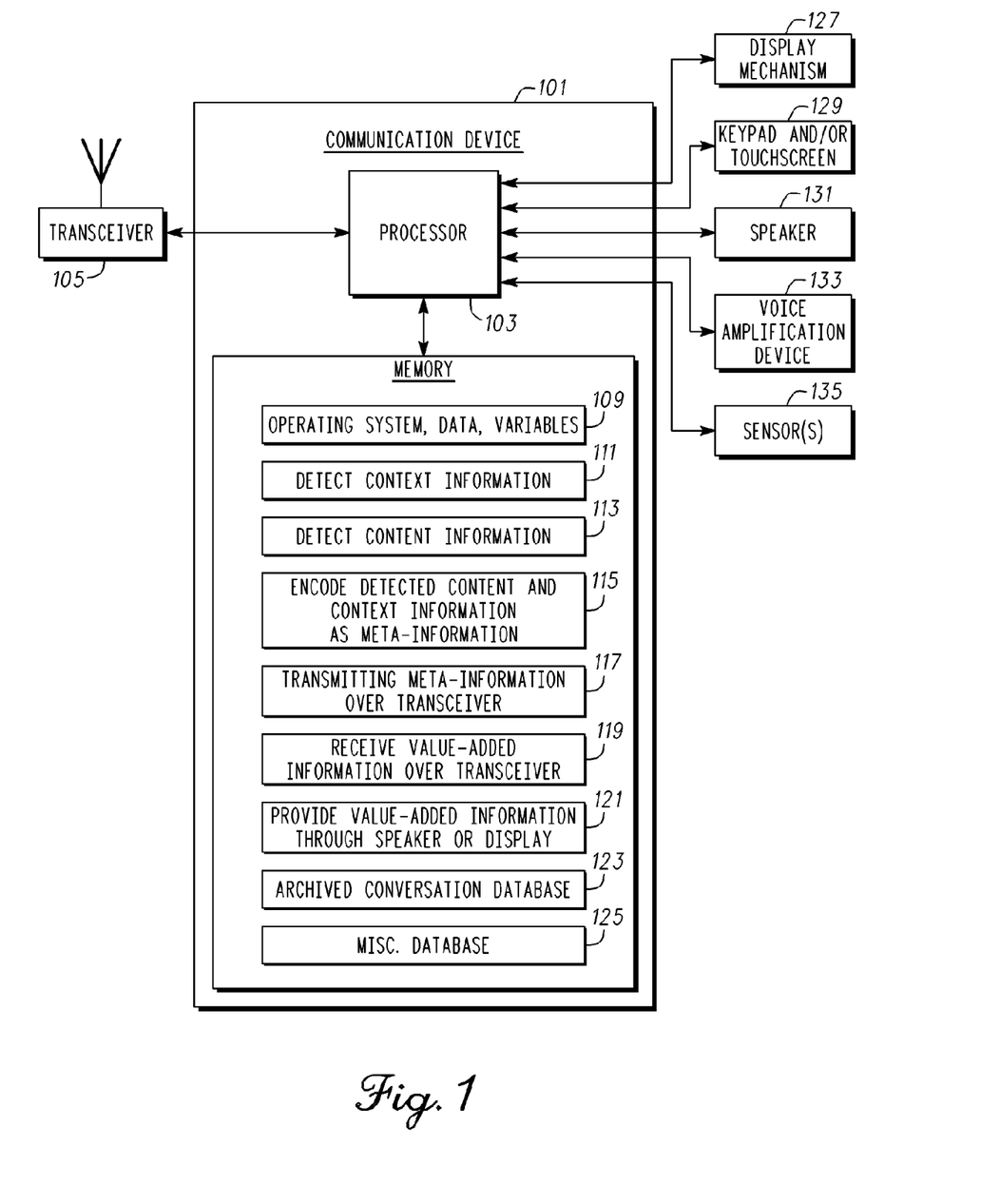
FIG. 1 is a diagram illustrating a simplified communication device for use in a communication network, the communication device providing value-added information to a user of the communication device.

Referring now to FIG. 1, a diagram illustrating a simplified communication device for use in a communication network will be discussed and described. FIG. 1 illustrates a communication device 101 that is capable of providing, and does provide, value-added information to the user of the communication device. The communication device 101 may include a transceiver 105, a processor 103, a memory 107, a display mechanism 127, a keypad and/or touch screen 129, a speaker 131, a voice amplification mechanism 133, and one or more sensors 135.

The processor 103 may comprise one or more microprocessors and/or one or more digital signal processors. The memory 107 may be coupled to the processor 103 and may comprise a read-only memory (ROM), a random-access memory (RAM), a programmable ROM (PROM), and/or an electrically erasable read-only memory (EEPROM). The memory 107 may include multiple memory locations for storing, among other things, an operating system, data and variables 109 for computer programs executed by the processor 103. The computer programs cause the processor 103 to operate in connection with various functions as now described. A detecting context information function 111 causes the processor 103 to detect context information representative of an environment in which the communication device is operated. The processor 103 operates to detect context information by acknowledging and interpreting signals received from one or more sensors 135 (described below) which measures environmental conditions related to the use of the communication device 101.

A detecting content information function 113 causes the processor 103 to detect content information of a multi-directional communication stream transmitted and received by the transceiver 105. In this regard, speech recognition can be considered as the baseline technology for performing the semantic analysis of speech communication to determine the content contained therein.

In present conventional technology, speech recognition is done only at designated nodes and only under designated use cases. The communication device 101 can perform speech recognition processing by default and can perform so in real time. Due to limited resources in the encoder devices, some offloading of processing and distributed processing is envisioned in the speech recognition analysis. Thus in addition to transmitting meta-information, the transceiver 105 will also communicate intermediate results processed during the speech recognition process such as speech energy analysis, spectral analysis, short term and long term trends etc, in order to facilitate effective post processing and offloading of some processing functions from the communication device 101 which is resource constrained.

It should be noted that the techniques used in the speech recognition process go beyond the current state of the art in the following areas: noise and echo analysis and reduction techniques, beam forming techniques for multiple microphones, speech enhancement techniques, speech and speaker recognition techniques, speech normalization, understanding cues (like pauses) in the conversation to recognize change in speakers, gisting and summarization techniques, natural language grammar analysis, and machine translation techniques.

An encoding function 115 causes the processor/encoder to encode the detected context information and the detected content information as meta-information. Using meta-information eliminates entropy in interpersonal speech and reduces complexity in processing of speech communication. Additionally, encoding detected content information mitigates many issues related to accessing private communications since the need for archiving/storage of actual (verbatim) communication can be eliminated. As described below in more detail, the meta-information serves as the reference information used in acquiring and providing value-added information to a user of the communication device 101.

A transmitting meta-information function 117 causes the processor to transmit the encoded meta-information through the transceiver 105 to one or more networks for real-time processing. The additional processing includes retrieval of value-added information related to the content and context information. A receiving value-added information function 119 causes the processor 103 to retrieve the value-added information returned through the transceiver 105.

A provide value-added information function 121 causes the processor to provide the value-added information through an output device such as the display mechanism 127 or speaker 131. Additionally, the provide value-added information function 121 can cause the processor to provide the value-added information to one or more external devices (not shown) through text messaging, email, and/or further forms of communication known to one of ordinary skill in the art.

The above describe functions stored as computer programs may be stored, for example, in ROM or PROM and may direct the processor 103 in controlling the operation of the communication device 101. The memory 107 can additionally store an archived conversation database 123 for storing meta-information obtained from previous communication streams. These previous communications streams may reflect previous conversations between the user of the communication device 101 and the same party or parties participating in the current communication stream or may simply be between the user of the communication device 101 and other parties not currently participating in the present communication stream. The encoding function 115 can thus also cause the processor 103 to further encode information from the previous communication streams as meta-information. The memory 107 additionally includes a miscellaneous database 125 for storing other data not specifically mentioned herein.

The processor 103 may be programmed to alert the user of the communication device 101 when a telephone call or other communication is received by the device. This may be done by way of an alerting device (not shown). The alerting device may use a conventional vibration or audible alerting mechanism, visual alert, and/or other alert, or a combination thereof. A user of the communication device 101 may invoke functions accessible to the user through a user input device such as keypad and/or touch screen 129. The display mechanism 127 may present information to the user by way of a conventional liquid crystal display (LCD) or other visual display, and the speaker 131 may present communications by playing out audible messages. The voice amplification device 133 may input speech communication from the user of the communication device 101, as is well known in the art.

One or more sensors 135, in communicable contact with the communication device 101, may determine context information representative of the environment in which speech communication using the communication device 101 takes place. Such sensors are of a wide variety and include global positioning satellite (GPS) devices, thermometers, time-keeping devices, sound-measuring devices, traffic-measuring devices, motion sensors, and/or further sensing devices, all of which are known in the art. The readings and measurements of one or more sensors 135 are detected and encoded as meta-information by the processor 103 according to the operations corresponding to the detecting context information function 111 and the encoding function 115. Stored meta-information, including content information acquired by the detecting content information function 113, is transmitted by the processor 103 according to the transmitting meta-information function 117.

Figure 2:
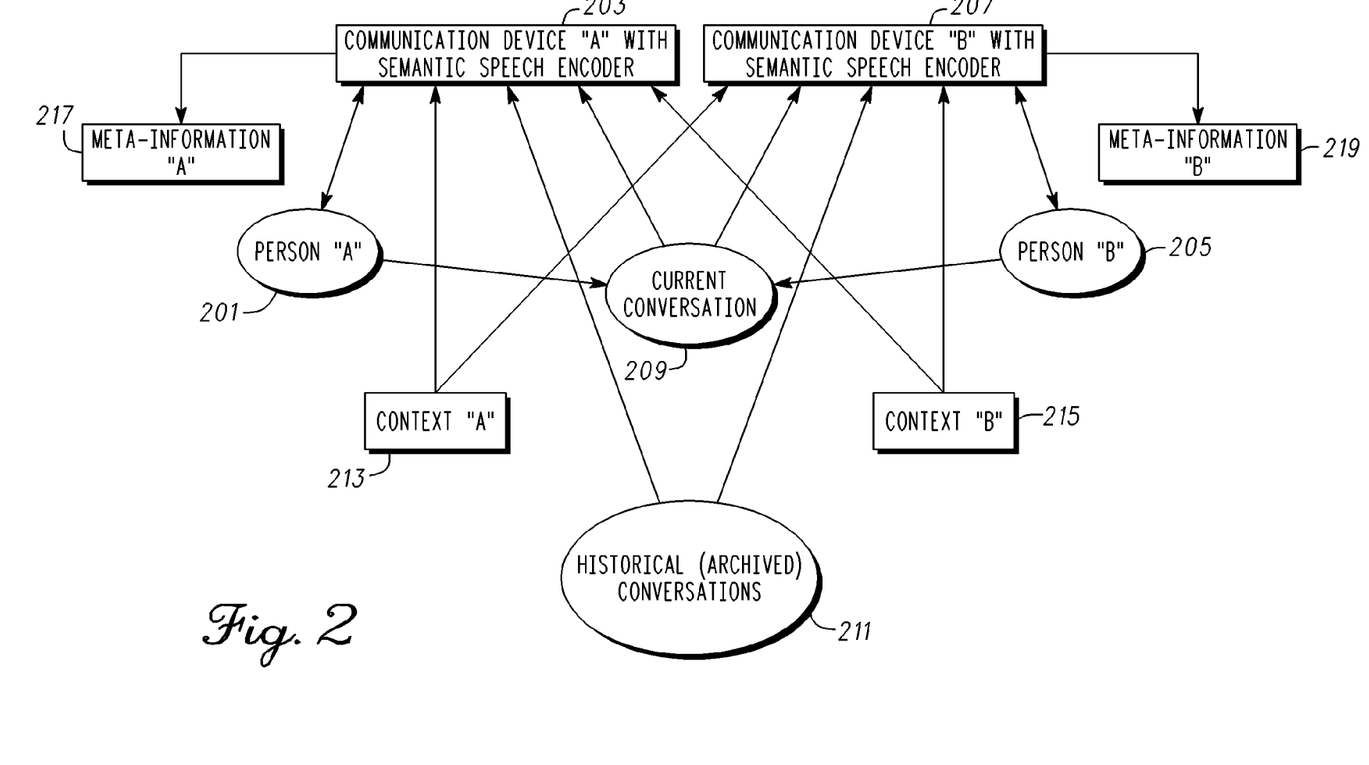
FIG. 2 is a block diagram illustrating associations relating two persons, two communication devices, a current conversation, historical conversations, a context in which each communication device is used, and the meta-information provided by each communication device.

Referring now to FIG. 2, a block diagram illustrating the associations relating two persons, two communication devices, a current conversation, historical conversations, a context in which each communication device is used, and the meta-information provided by each communication device will be discussed and described. The communication devices can be, for example, of the type illustrated in FIG. 1 and described above. The diagram illustrates person A 201, person B 205, communication device A 203, communication device B 207, context A 213, context B 215, a current conversation 209, historical conversations 211, meta-information A 217 and meta-information B 219.

As illustrated in FIG. 2, person A 201 and person B 205 are engaged in a multi-directional communication that is a real-time, current conversation 209. A one-way arrow is therefore illustrated from person A 201 to current conversation 209 as well as from person B 205 to current conversation 209 to indicate a one-way direction of each person contributing to the current conversation 209. Person A 201 is using communication device A 203 and person B 205 is using communication device B 207. Two-way arrows are thus drawn from each device to the corresponding user to indicate a two-way direction of communication. As the conversation ensues, each of communication device A 203 and communication device B 207 operates according to a detecting content function 113 as is described above related to FIG. 1. That is to say, the processor 103 of each communication device can include a speech-recognition function that determines the content of current conversation 209. Thus a one-way arrow is directed from current conversation 209 to both communication device A 203 and communication device B 207 to indicate that content information is delivered to these devices.

Each of communication device A 203 and communication device B 207 also is operating in a particular context, including context A 213 for communication device A 203, and context B 215 for communication device B 207. The one or more sensors 135 of each device measure various environmental conditions that comprise the context in which each device operates. Context A 213 is directly available to communication device A 203 as is indicated by the one-way arrow extending from context A 213 to communication device A 203. Additionally, context B 215 is directly available to communication device B 207, as is indicated by the one-way arrow extending from context B 215 to communication device B 207. Additionally, each context is available to the other device through communication functions (not shown). Thus a one-way arrow additionally extends from context A 213 to communication device B 207 and from context B 215 to communication device A 203. Thus each communication device is able to encode as meta-information, the context in which both communication device A 203 and communication device B 207 operate.

As described above, communication device A 203 and communication device B 207 each can store meta-information related to past conversations. Although each of communication device A 203 and communication device B 207 can have a separate database, this archived information is represented in FIG. 2 as historical conversations 211. Thus a one-way arrow is drawn from historical conversations 211 to both devices. If the processor 103 in either device during the encoding process determines that there is relevant data stored as historical conversations 211, then this information can be re-encoded and transmitted as meta-information in a request for value-added information.

Communication device A 203 and communication device B 207 each may receive content information related to a current conversation, context information related to environment in which one or both of the communication devices operate, and information related to archived conversations. Either or both of communication device A and communication device B can operate to encode this data so as to create meta-information. Thus a one-way arrow extends from communication device A 203 to meta-information A 217, and a one-way arrow extends from communication device B 207 to meta-information B 219. As described below, the meta-information is then distributed across one or more networks in order to acquire value-added information. This value-added information can then be provided to the corresponding user of communication device A 203 and communication device B 207. It should be noted that in some instances, if the value-added information is consumed by a user in near real time, the user can provide near real time feedback to a communication device so that additional meta-information can be optimized to provide higher priority or higher quality value-added information.

Figure 3:
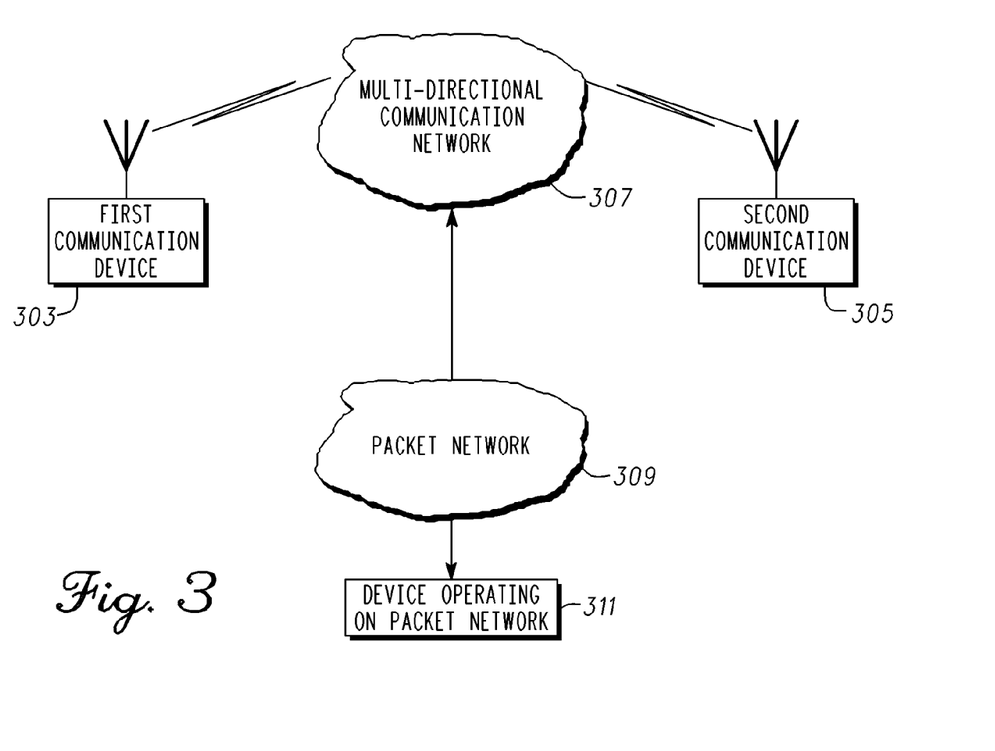
FIG. 3 is a network diagram illustrating an arrangement of two communication devices operating over a multi-directional communication network, the multi-directional communication network communicatively coupled to a packet network.

Referring now to FIG. 3, a network diagram illustrating an arrangement of two communication devices operating over a multi-directional communication network will be discussed and described, the multi-directional communication network being communicatively coupled to a packet network. A first communication device 303 and a second communication device 305 can be engaged in a multi-direction communication over a multi-directional communication network 307. The communication devices illustrated in the diagram may be of the type illustrated in FIG. 1 and described above.

It should be noted that the term communication device specifically indicates devices sometimes referred to as subscriber unit, wireless subscriber unit, wireless subscriber device or the like. Each of these terms denotes a device ordinarily associated with a user and typically a wireline telephone or wireless mobile device that may be used with a public network, for example in accordance with a service agreement, or within a private network such as an enterprise network. Examples of such units include personal digital assistants, personal assignment pads, and personal computers equipped for wireline or wireless operation, a cellular handset or device, Internet telephones, conventional telephones used over a plain-old-telephone-system (POTS) or equivalents thereof.

The multi-directional communication network 307 may be any analog or digital network that operates wirelessly such as a cellular network as is known in the art. Thus the first communication device 303 and the second communication device 305 may be participating in a cellular telephone call. The illustrated first communication device 303 and the second communication device 305 thus operate to encode meta-information related to the content of the cellular telephone call which could include one or more different subjects being discussed. In addition, the first and second communication device each can further encode meta-information related to the context in which each communication device operates. As described above, each of the communication devices transmits the meta-information across the multi-directional communication network 307.

The multi-directional network 307 is communicatively coupled to a packet network 309. The transmitted meta-information from either one or both of the first and second communication devices 303, 305 is propagated to the packet network 309. Connected to the packet network 309 is at least one device 311 operating on the packet network 309, storing data. Such devices could include routers, servers, personal computers, network infrastructure devices, portable devices, or any other similar computing device known in the art. The transmitted meta-information is used by the at least one device 311 to determine whether there is appropriate information that relates to either the content or context information that has been encoded as meta-information and would provide utility to a user of one or both of the first and second communication devices 303, 305. In the case that there is relevant information stored in the at least one device 311, this information is then propagated across the packet network 309 and onto the multi-directional communication network 307 where it is transmitted back to either one or both of the first and second communication devices 303, 305 as value-added information. It should be noted that in some instances where the meta-information relates to a specific, particular context, the processing maybe offloaded to a server specialized to handle that particular context.

By way of further detail, it should be also be noted that the packet networks described herein include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar. In this way, communications between the packet network 309 and the multi-direction communication network 307 are achieved.

Figure 4:
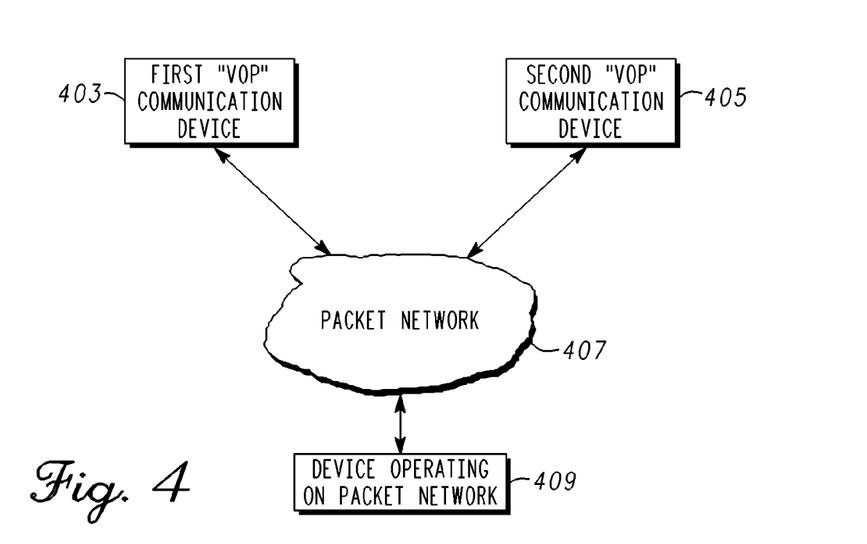
FIG. 4 is a network diagram illustrating an arrangement of two communication devices operating over a packet network.

Referring now to FIG. 4, a network diagram illustrating an arrangement of two communication devices operating over a packet network will be discussed and described. A first VOP (voice over packet) communication device 403 and a second VOP communication device 405 can be engaged in a multi-direction communication. However in the illustrated scenario, each of the first and second VOP communication devices 403, 405 is a voice-over-packet capable telephone operating directly on a packet network 407. The first and second VOP communication devices 403, 405 illustrated in the diagram may be communication devices of the type illustrated in FIG. 1 and described above or other communication device appropriately arranged. In some variations, the coupling to the packet network with first and second VOP communication devices 403, 405 may be through other than wireless means, for example, a wired connection. Users of the first and second VOP communication devices 403, 405 can communicate through a VOP telephone call as is known in the art. VOP telephone calls transmit content in packets over the packet network 407 in accordance with well known techniques.

The communication device can encode meta-information related to the content of the VOP telephone call which could include one or more different subjects being discussed. In addition, the communication device can encode meta-information related to the context in which each VOP telephone operates. As described above, the communication device can transmit the meta-information across the packet network 407.

The transmitted meta-information from either one or both of the first and second VOP communication devices 403, 405 is propagated across the packet network 407 to at least one device 409 operating on the packet network 411, storing data. Such devices could include routers, servers, PC's, portable devices, or any other similar computing device known in the art. The transmitted meta-information is used by the at least one device 409 to determine whether there is appropriate information that relates to either the content or context information that has been encoded as meta-information and would provide utility to a user of one or both of the first and second communication devices 403, 405. In the case that there is relevant information stored in the at least one device 409, this information is then propagated through the packet network 411 and back to either or both of the first and second VOP communication devices 403, 405 as value-added information. Again, it should be noted that in some instances where the meta-information relates to a specific, particular context, the processing may be offloaded to a server specialized to handle that particular context.

Figure 5:
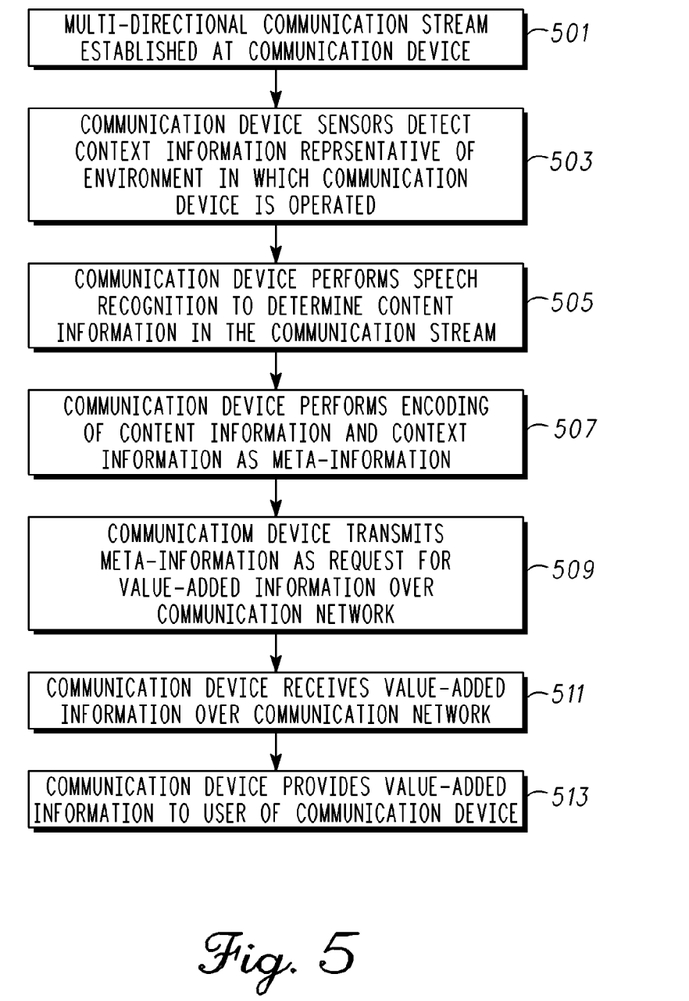
FIG. 5 is a flow chart illustrating a method for providing value-added information to a user of a communication device.

Referring now to FIG. 5, a flow chart illustrating a method for providing value-added information to a user of a communication device is discussed and described. The method advantageously can be implemented on, for example, a processor of a communication device described in connection with FIG. 1, or other apparatus appropriately arranged. A multi-directional communication stream is established 501 at a communication device, in accordance with known techniques. For example, the multi-directional communication stream can be established between two or more communication devices by setting up a call.

One or more communication device sensors of the communication device detect 503 context information representative of an environment in which the communication device is operated. The communication device sensors are conventionally provided on the communication device so that the communication device can directly detect, for example, location, temperature, time, traffic conditions, or like other environmental properties.

The communication device can perform 505 speech recognition on the multi-directional communication stream, thereby determining content information of the multi-directional communication stream. It should be noted that typical available speech recognition software and/or hardware can be used to identify significant words in the multi-directional communication stream, which can be used as the content information. The speech recognition can be conducted on communication packets to the communication device and/or communication packets from the communication device. It should additionally be noted that at least two easily seen applications of the embodiments described herein would be to detect content information related to goods to be purchased by the user of the communication device. A second easily seen application of the embodiments described herein would be to detect content information related to scheduling an appointment with a service provider.

The communication device performs 507 encoding of the content information and/or context information as meta-information. More particularly, the content information and/or context information can be embedded as meta-data in communication packets which are to be transmitted in the multi-directional communication stream. More particularly, the context information can be embedded in a header of one or more communication packets. Because the meta-information can be embedded in one or more communication packets, note that other communication devices involved in the multi-directional communication stream can receive the meta-information which was originated by the communication device that directly sensed the context. Accordingly, communication devices participating in the multi-directional communication stream can exchange context information.

The communication device then transmits 509 the meta-information in a communication packet marked as a request to obtain value-added information over a communication network; the request can be directed to a back-end device on the communication network. One or more communication packets with meta-information embedded therein can be received by the back-end device and interpreted as requests to obtain value-added information. As described above, real-time processing on the meta-information by devices operating on a packet network (discussed for example in connection with FIG. 3), or other network, can retrieve value-added information from stored data accessed by the back end device.

The value-added information is then transmitted back across the packet network to the communication device, such that the communication device receives 511 the value-added information in one or more communication packets. Preferably, the value added information is provided as content in the communication packets so that it can be readily displayed by a communication device.

The communication device then provides 513 the value-added information which was received to a user of the communication device. For example, the communication device can display the value-added information on a display mechanism, or notify the user via a speaker of the value-added information. Alternatively, the communication device can forward the value-added information as text messages, email messages, or through other communication forms as is known in the art.

An example of one or more embodiments described herein is now provided. John is driving his car when his wife Alice uses her cellular phone to call him on his cellular phone. This conversation occurs as a multi-directional communication stream, in which the two communication devices are Alice's and John's cellular phones. During the conversation, Alice asks John to get "jalapeno peppers" at some point during the day, in order for her to prepare a "stuffed jalapeno" dish being served at a family gathering that evening, Friday night. Both cellular phones can be of the type of devices described herein, or variations thereof. The term "jalapeno" is recognized by either or both cellular phones as content information, and is encoded as content information into communication packets used during the conversation.

During the call, John's cell phone alerts him by voicing or displaying a message that his daughter Lucy is at home, and thus not attending school as expected. John's cell phone is aware of this fact because Lucy's cell phone is transmitting a context of Lucy's cell phone, which is that her phone is physically located at home (detected via Lucy's cell phone's GPS, its proximity to network infrastructure devices such as a cell tower). Lucy's cell phone can be used to provide an expanded context since Lucy's cell phone is associated with John's cell phone due to both phones being assigned to the same subscriber. John verbally confirms with Alice that Lucy is at home and further determines from Alice that Lucy is sick. John promises Alice to set up a doctor's appointment either for late that Friday evening or early the next day, Saturday.

During the call Alice's cell phone alerts her that John is driving on a very busy highway having intermittent congestion, and that he may not be able to pay a lot of attention during the call due to frequent interruption. Alice is aware of this fact because John's cell phone is transmitting context information about the location of the cell phone (detected e.g., via John's cell phone's GPS or by proximity to network infrastructure devices) in John's car.

John's cell phone has now detected that the content of the conversation between John and Alice relates to "jalapeno peppers" and "stuffed jalapenos." Additionally, meta-information generated during the call captures context information related to the conditions in which John is using his cell phone, which includes for example, that John is heading towards a meeting with a client (the context being retrieved from a calendar function in the cell phone), and could have at least two hours to spare even in the presence of congested traffic John's cell phone (through intermediary network infrastructure devices which are well known in the art) contacts servers on the Internet specializing in handling recipes, automatically without manual intervention from John, and transmits a request for information related to jalapenos. The servers acquire information related to "jalapenos" (for example, using a commercial search service) and return this information to John's cell phone. In this example, the information includes vendors which offer jalapenos, directions to those stores given the current traffic conditions, prices of jalapenos, and possibly other information relating to "jalapenos." At the termination of the phone call between John's and Alice's cell phone, John's cell phone displays the value-added information it received, that is, a list of vendors of products discussed during the conversation, including for example stores carrying fresh jalapenos, including information on pricing and on directions of the easiest route to each store, given the acquired traffic conditions. Alice's cell phone in contrast uses the derived content information to prompt Alice to provide necessary information to John about "jalapeno peppers" and "stuffed jalapeno" that she might have failed to provide to John earlier.

John's cell phone has additionally detected, using speech recognition, that part of the content of the call relates to scheduling a physician's appointment. John's cell phone also has access to a conventional appointment application (also referred to herein as a "calendar application") executing on the phone. The content information related to the need for a physician's appointment is included as meta-information that is transmitted to servers on the Internet. The value-added information returned includes the identification of medical offices that are available on Saturdays and located near John's home. Using conventional techniques, the calendar application recognizes that John's calendar is clear the next day, schedules an appointment on John's calendar, and automatically without manual intervention connects John's phone with the medical office to confirm the appointment by automatically dialing the medical office.

The designation "context information" is used herein specifically to indicate information detected by a communication device as it is being used, for example by using sensors such as global positioning satellite (GPS) devices (to indicate location, velocity, direction, and/or altitude), thermometers (to indicate temperature), time-keeping devices (to indicate date and time and/or temporal duration), sound-measuring devices (to indicate level of decibels), traffic-measuring devices (such as a GPS location in traffic, sensed road noise, or a combination thereof), motion sensors (to indicate activity and/or direction), and the like, or a speaker recognition unit, all being located at the communication device having the context information. In some embodiments, context information can include an identity of a speaker, for example as determined by a conventional speaker recognition unit, system, or function. In still more embodiments, context information can include date, time and location of meetings scheduled in a calendar application provided on the communication device. The context information is defined as being "representative of an environment" to specifically mean that the context information is sensed directly by a sensing device located on the communication device, and consequently indicates the environment in which the communication device is used. Context information can relate to any communication device on the communication network; in some embodiments, the context information is limited to the communication devices in a conversation on the communication stream, and possibly extended to other communication devices known to be assigned to a subscriber of the communication devices in the conversation. Directly sensed context information can be further augmented to create augmented context information by using a combination of directed sensed context information.

The designation "content information" is used herein specifically to indicate the terms and/or expressions recognized in the voice content by a speech recognition unit, system or function as being significant words, according to conventional speech recognition techniques. The designation "significant words" is defined herein to mean those words or phrases (or combinations thereof) which the speech recognition unit, system or function has been programmed to recognize, for example via a pre-defined vocabulary and/or pre-defined legitimate expressions.

The term "multi-directional communication stream" is used herein specifically to indicate a communication stream which has been established and remains established in accordance with known techniques between at least two communication devices (for example, cellular telephones, voice over packet-enabled telephones, land-line telephones, or a combination thereof), and in which communication packets exchanging voice data can be communicated from and to each of the at least two communication devices which are the end points of the communications. In some variations, the multi-directional communication stream can be a two-party, three-party, or more party call between two, three, or more communication devices as end points of the communication. The multi-directional communication stream can be for example a telephone call using a cellular telephone network, a VOP telephone call using VOP communications, and/or a combination thereof or the like. Additionally, a multi-directional communication stream can include one or more landline phones as one end of the communication stream. The term "conversation" is used to mean the communications which specifically begin after the call is established but terminate at the time that the communication stream is disconnected or hung up, as is known in the art.

A "communication network", as the term is used herein, broadly refers to any network over which telecommunications can occur. A communication network can be of a type colloquially referred to as a cellular communication network or a computer network (for example, local area network or wide area network) such as the Internet.

The designation "value-added information" is used herein specifically to mean information that is related to, and associated with, content and context information, and provides additional utility to a user of the device. The value-added information is made available to the communication device after being received from the packet network, and can be displayed to the user of the communication device once it is received from the packet network.

The term "real-time processing" as used herein is defined as occurring during the conversation or immediately thereafter in response to the communication stream being terminated such as by being disconnected or hung up.

The term "meta-information" is defined to mean that the information is encoded as meta-data in a header of a communication packet which is then communicated from one of the communication devices to the other communication device engaged in the multi-directional communication stream.

It should be noted that this disclosure is intended to explain how to fashion and use various embodiments rather than to limit the true, intended, and fair scope and spirit of said embodiments. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of providing value-added information to a first user of a first communication device, the method comprising:
    sensing first context information representative of a first environment in which the first communication device is operated by the first user;
    sensing second context information representative of a second environment in which a second communication device is operated by a second user;
    detecting content information of a conversation between the first and second users by identifying significant words in the conversation, wherein the conversation occurs as a multi-directional communication stream transmitted and received in a communication network between the first and second communication devices;
    encoding the sensed first and second context information and the detected content information as first meta-data;
    determining whether archived meta-data includes relevant content information of significant words in a past conversation between the first user and at least one of: the second user; and a third user of a third communication device;
    in response to determining that the archived meta-data includes the relevant content information, encoding the relevant content information as second meta-data;
    acquiring the value-added information by performing real-time processing using the first and second meta-data, including acquiring the value-added information in response to at least: the sensed first and second context information and the detected content information that are encoded as the first meta-data; and the relevant content information that is encoded as the second meta-data; and
    providing the value-added information to at least the first user via the first communication device.

2. The method of claim 1, wherein
detecting content information is performed using speech recognition on the multi-directional communication stream.

3. The method of claim 1, wherein
acquiring the value-added information by performing real-time processing includes:
    the first communication device transmitting, using the first and second meta-data, at least one request to retrieve the value-added information, and
    the first communication device receiving the value-added information, in response to the at least one request.

4. The method of claim 1, wherein
the first communication device is a cellular phone;
the multi-directional communication stream is a cellular telephone call, and
acquiring the value-added information by performing real-time processing includes:
    the cellular phone transmitting, using the first and second meta-data, at least one request to retrieve the value-added information to at least one device connected to a packet network after the at least one request is transmitted through the cellular network, and
    receiving by the cellular phone, through the cellular network, the value-added information, in response to the at least one request, provided by the at least one device connected to the packet network.

5. The method of claim 1, wherein
the first communication device is a voice-over-packet (VOP) capable telephone;
the multi-directional communication stream is content in packets transmitted as part of a telephone call placed over a packet network; and
acquiring the value-added information by performing real-time processing includes:
the VOP capable telephone transmitting, using the first and second meta-data, at least one request to retrieve the value-added information to at least one device connected to the packet network, and
receiving by the VOP capable telephone the value-added information, in response to the at least one request, provided by the at least one device connected to the packet network.

6. The method of claim 1, wherein
detecting content information of a conversation includes detecting information about goods to be purchased by at least the first user, and
providing value-added information includes providing at least the first user with at least a list of vendors of the goods to be purchased.

7. The method of claim 1, wherein
detecting content information of a conversation includes detecting information about an appointment, and
providing value-added information includes providing at least the first user with appointment information regarding the time, date and location of a scheduled appointment, the appointment information being automatically entered into a calendar application of the first user.

8. The method of claim 1, wherein
providing the value-added information to at least the first user includes displaying the value-added information on a display mechanism of the first communication device.

9. A first communication device, for use in a communication network and for providing value-added information to at least a first user of the first communication device, comprising:
a transceiver operable to transmit and receive communications over the communication network;
a processor cooperatively operable with the transceiver, and configured to facilitate:
sensing first context information representative of a first environment in which the first communication device is operated by the first user;
sensing second context information representative of a second environment in which a second communication device is operated by a second user;
detecting content information of a conversation between the first and second users by identifying significant words in the conversation, wherein the conversation occurs as a multi-directional communication stream transmitted and received in the communication network between the first and second communication devices;
encoding the sensed first and second context information and the detected content information as first meta-data;
determining whether archived meta-data includes relevant content information of significant words in a past conversation between the first user and at least one of: the second user; and a third user of a third communication device;
in response to determining that the archived meta-data includes the relevant content information, encoding the relevant content information as second meta-data;
transmitting the first and second meta-data as at least one request for the value-added information;
receiving the value-added information in response to the at least one request, including receiving the value-added information in response to at least: the sensed first and second context information and the detected content information that are encoded as the first meta-data; and the relevant content information that is encoded as the second meta-data; and
providing the value-added information to at least the first user via the first communication device.

10. The first communication device of claim 9, wherein detecting content information is performed by the processor using speech recognition on the multi-directional communication stream.

11. The first communication device of claim 9, wherein the first communication device is a cellular telephone, and the multi-directional communication stream is cellular telephone call.

12. The first communication device of claim 9, wherein the first communication device is a telephone capable of performing voice-over-packet (VOP) communication, and the multi-directional communication stream is a telephone call placed over a packet network.

13. The first communication device of claim 9, wherein detecting content information of a conversation includes detecting information about goods to be purchased by at least the first user, and
providing the value-added information includes providing at least the first user with at least a list of vendors of the goods to be purchased.

14. The first communication device of claim 9, wherein detecting content information of a conversation includes detecting information about an appointment, and
providing the value-added information includes providing at least the first user with appointment information regarding the time, date and location of a scheduled appointment, the appointment information being automatically entered into a calendar application of the first user.

15. The first communication device of claim 9, wherein providing the value-added information to at least the first user includes displaying the value-added information on a display mechanism of the first communication device.

* * * * *